Patented Feb. 27, 1945

2,370,565

UNITED STATES PATENT OFFICE 2,370,565

POLYBASIC ACID-POLYHYDRIC ALCOHOL ESTERS AND POLYMERS THEREOF

Irving E. Muskat and Franklin Strain, Akron, Ohio, assignors to Pittsburgh Plate Glass Company, Allegheny County, Pa., a corporation of Pennsylvania No Drawing. Application October 15, 1940, Serial No. 361,282

19 Claims. (Cl. 260—78)

This invention relates to novel compositions, polymers of such compositions, and methods of preparing such polymers. In accordance with the present invention, we have prepared a novel class of esters of polyglycols, particularly polyalkylene glycols, and acid esters of polybasic acids and unsaturated alcohols. Thus, we have been able to prepare complex esters of various polyglycols such as diethylene, triethylene, tetraethylene, pentaethylene, dipropylene, tripropylene, tetrapropylene, dibutylene, or other polyglycol.

Esters of various acid esters may be prepared. For most purposes it is found desirable to esterify with the above hydroxy compounds, the acid esters of various polybasic acids and a lower unsaturated aliphatic alcohol containing up to about 10 carbon atoms such as the vinyl, allyl, methallyl, crotyl, 2-chloroallyl, chlorocrotyl, ethylallyl, cinnamyl, propargyl, methyl vinyl carbinyl or other lower unsaturated alcohol or halogenated alcohol, particularly alcohols capable of forming polymerizable esters. Partial esters of higher unsaturated alcohols such as oleyl or linoleyl alcohol or other alcohols which may be be secured from coconut oil, China-wood oil or other unsaturated oil by reduction of the acids therein to alcohols may be utilized also.

The partial esters herein contemplated may be esters of any suitable polybasic acid such as carbonic, cyanuric, kojic, thiocarbonic, or polycarboxylic acids, such as oxalic, maleic, fumaric, dimethyl maleic, tartaric, succinic, malonic, phthalic, glutaric, adipic, pimelic, sebacic, itabonic, mesaconic, citraconic, citric, malic, terephthalic, acetone dicarboxylic acid, tricarballylic, kojic, and other organic acids or inorganic polybasic acids such as sulphuric, sulphurous, phosphoric, phosphorous, boric, silicic, titanic, or chromic acids, etc. Likewise, the corresponding thio acids of the above-mentioned carboxylic acids may be treated in this manner.

These compounds may be prepared by various methods, such as by esterifying the partial ester. For example, an acid ester of a polybasic acid and an unsaturated alcohol may be esterified with a polyhydric alcohol. Thus, the allyl acid ester of various acids such as sulphuric, phosphoric, maleic, malonic, oxalic, tartaric, citric, or similar acid may be esterified with ethylene glycol, or diethylene glycol, etc. to produce the mixed ester desired.

Alternatively, the polyhydric alcohol ester of a polybasic acid such as diethylene glycol dihydrogen diphthalate or other ester having the general formula

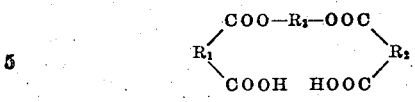

where $R_1$ and $R_2$ are organic radicles and $R_3$ is an alkylene or polyalkylene radicle, or other partial esters of a polyhydric alcohol and a polybasic acid may be esterified with an unsaturated alcohol such as allyl alcohol or with a mixture of such alcohols such as methallyl and allyl or allyl and crotyl, allyl and 2-chlorallyl, methallyl and crotyl, methallyl and 2-chlorallyl, alcohol, etc. The esterification may be effected by heating the acid ester with the desired alcohol in the presence of suitable esterification catalysts, such as p-toluenesulfonic acid, HCl, etc., preferably at a temperature of approximately 100° C.

In order to avoid ester interchange or other side reactions, the corresponding salts may be reacted with unsaturated allyl type halides such as allyl, methallyl, 2-chlorallyl, ethylallyl or crotyl chloride or bromide. Thus, mono-sodium or potassium or silver salts of various dibasic acids such as phthalic, maleic, fumaric, citraconic, or other acids may be esterified with a polyhydric alcohol such as glycol, diethylene glycol, glycerine, etc. to form the corresponding partial ester or other suitable methods may be used to prepare this ester. Thereafter, the resulting product may be reacted with allyl or methallyl or similar chloride in accordance with the method described in copending applications of Maxwell A. Pollack and Albert G. Chenicek, Serial Nos. 315,968, 315,969, and 315,970, filed January 27, 1940, now U. S. Patents 2,275,466, 2,275,467, and 2,296,823, respectively.

In the preparation of carbonate esters high yields may be obtained by reaction of an unsaturated chloroformate such as allyl, methallyl, crotyl, oleyl, or similar chloroformate with a polyalkylene glycol. Likewise, similar esters may be prepared by forming the polychloroformate of a polyalkylene glycol such as diethylene glycol or similar compound and thereafter treating the chloroformate with an unsaturated alcohol.

The manufacture of these esters may be effected by various methods. In accordance with one suitable method of preparing carbonate esters, the allyl or methallyl, or other unsaturated chloroformate may be formed and utilized as an intermediate. This compound may be formed, for example, by passing gaseous phosgene through a suitable alcohol. Thereafter, the alcohol and other impurities may be removed by washing the chloroformate with water and drying by means of suitable dehydrating agents, such as calcium chloride, etc.

This chloroformate may then be reacted with hydroxy or amino compounds, preferably in the presence of an alkaline agent such as pyridine, sodium or potassium hydroxide or carbonate, calcium, magnesium, or barium hydroxide or other alkaline agent capable of removing HCl which may otherwise be formed in the reaction. Thus, polyglycols such as diethylene, triethylene, dipropylene, tripropylene glycol or other polyglycol may be reacted with the allyl, methallyl, or other chloroformate to form the ester. This esterification may be conducted in an aqueous or nonaqueous medium, preferably in an organic solvent such as acetone, dioxane, pyridine, etc.

Alternatively, the corresponding polychloroformate of the polyglycol may be formed by treatment with phosgene. These chloroformates may be reacted with unsaturated alcohols such as allyl, methallyl, oleyl, crotyl, linoleyl, 2-chlorocrotyl, etc. alcohol. As in the esterification of the unsaturated chloroformates, the reaction is preferably conducted in the presence of an alkaline agent.

In the preparation of these polychloroformates it is found desirable to regulate the temperature of operation in order to minimize or prevent formation of ring compounds. Thus, in treating glycol, the temperature is preferably maintained below about 20° C. In most cases cooling the reaction mixture by means of an ice bath or equivalent cooling means improves the yield of chloroformate to a marked degree.

The esters may be recovered from the reaction mixture by distillation. However, these materials are high boiling liquids or solids and this is often difficult. Accordingly, the esters are often purified by washing the reaction mixture with water.

The compositions herein described vary from high boiling point liquids to solids. Many of the liquids are very clear and colorless and are miscible with numerous organic solvents such as acetone, alcohol, chloroform, dioxane, benzene, xylene, toluene, ethyl ether, paraffin hydrocarbons, etc.

These compositions may be used for many purposes such as solvents, paint compositions, pharmaceuticals, plasticizers, etc. for various materials such as cellulose, vinyl, urea, phenol, acrylic or styrene resins or plastics. In particular, the products are found to polymerize in the presence or absence of catalysts, such as heat, light, oxygen, ozone, peroxides, such as lauryl or benzoyl peroxide, etc., to form products of desirable character.

By polymerization of these compounds, it is possible to secure a wide range of polymers, some of which are extremely hard, while others are soft, flexible and often rubber-like in character. In general, the polymers thus obtained are transparent and colorless, although the polymer occasionally may be slightly yellow. If desired, the compounds herein described may be cast polymerized to form products having various shapes. These polymers in their finally cured state are substantially infusible and insoluble, and in general, are substantially unaffected by acids, alkalies, water or organic solvents.

In accordance with the present invention, intermediate polymers which are fusible or thermoplastic also may be prepared. In general, such polymers are soluble in various organic solvents such as acetone, carbon tetrachloride, benzene, xylene, toluene, dioxane, etc. These fusible polymers may be further polymerized to an infusible state to form products similar to the infusible polymers mentioned above. Thus, the fusible polymer may be molded or otherwise shaped and polymerized by means of heat and/or light to form shaped products which are substantially infusible and insoluble and which retain their shape permanently.

This method of preparing infusible polymers is highly advantageous since it is often found that the production of cast polymers is complicated by the formation of fractures, bubbles, or other defects during polymerization. These difficulties are avoided through use of the fusible polymer. In addition, more completely polymerized products are obtainable by this means.

The fusible polymers herein described may be prepared by polymerizing the unsaturated compounds which contain at least two polymerizable unsaturated groups until substantial polymerization has occurred and interrupting polymerization before the polymer is converted into a gel. It is fond that when polymerization of these materials is initiated, a fusible polymer is preliminarily formed. As polymerization proceeds, the monomer-polymer mixture is converted into a gel which is substantially infusible. This polymer does not fuse at atmospheric pressure. Further polymerization hardens the polymer to its final state of polymerization.

By interrupting the polymerization, it is possible to remove a portion or all of the monomer and to recover the fusible polymer substantially free from monomer or at least as a concentrate containing substantially less monomer than is present in the monomer-polymer mixture formed by ordinary polymerization of undiluted monomer. This interruption of polymerization may be effected by cooling, addition of inhibitors or by other methods as hereinafter more fully described.

The method of securing the fusible polymer is dependent upon the nature of the material which is undergoing polymerization. In general, it is possible to secure the fusible material in superior yields by polymerizing the monomer in a solution in which the fusible polymer is normally soluble. This polymer is generally soluble in the solvents which are capable of dissolving the usual thermoplastic vinyl or acrylic resins, such as polymethyl methacrylate or polyvinyl acetate. Thus, such solvents as acetone, dioxane, chloroform, toluene, benzene, carbon tetrachloride, methyl cellosolve acetate, phenyl cellosolve, dichlorethyl ether, xylene, tetralin, dibutyl phthalate, trichlorethylene, tetrachloroethane, etc., or mixtures of these solvents generally are found to be suitable. Solutions having concentrations of 10 to 60 percent of monomer yield satisfactory results.

In each case, the polymerization may be interrupted before the infusible product is produced. This may be accomplished by stopping polymerization as the mixture of monomer and polymer begins to grow viscous and before infusible gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the material is polymerized in solution. Polymerization may also be halted by lowering the temperature of the reaction mixture to a suitable degree, for example, to room temperature or below.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc. may be added to the polymer during polymerization or before polymerization has been initiated. When the fusible polymer is produced in solution, it may be recovered by methods other than by treatment with a nonsolvent, such as by slow evaporation or distillation of the solvent. These fusible polymers may be extruded, molded, shaped, or otherwise worked into desirable forms and after final shaping, the products may be completely hardened and rendered infusible by suitable methods hereinafter more fully set forth.

In polymerizing the compounds herein contemplated, the time required in order to initiate polymerization and to secure a fusible polymer varies widely in view of the slight traces of peroxides or inhibitor which may be present. For this reason, the viscosity of the composition undergoing polymerization is observed and, in general, polymerization is interrupted after the viscosity of the composition has approximately doubled. In many cases, subjection of the compound to polymerization conditions for a period of one-half to ten hours is sufficient, although some compounds polymerize somewhat more slowly.

Generally, it is preferred to conduct the polymerization in solution in order to secure improved yields. Thus, it is found that the presence of a solvent substantially improves the yield of fusible polymer. Likewise, addition of inhibitor may improve yields although in such a case the rate of polymerization is comparatively slow.

It is also possible to produce the fusible polymer in accordance with our invention without resorting to the use of solutions of the monomer, although the yield of polymer is, in general, somewhat lower than when a solvent is present. Thus, the monomer may be polymerized directly by use of heat and/or light, preferably in the presence of catalysts, such as air, ozone, oxygen, peroxides, and the like, and interrupting polymerization at the proper time. Since the polymerization may proceed without undue rapidity, with many of these materials, the reaction may be stopped before the infusible gel is reached without difficulty, either by use of inhibitors or by cooling as hereinbefore mentioned.

The fusible polymer so produced may be molded to any desired shape and subsequently cured to the infusible state. In treating materials which polymerize slowly, it is found that if considerable monomer is retained by the polymer upon curing, considerable difficulty is encountered in securing complete or substantially complete polymerization of the residual monomer. This may be undesirable. Accordingly, we have found that in most cases, it is desirable to remove all or a portion of such monomers from the polymer prior to curing the polymer to its infusible state. In accordance with one convenient method, the monomer may be distilled from the polymer under conditions whereby the possibility of further polymerization is minimized, for example, by distillation in a vacuum, preferably at low temperatures, or in the presence of added inhibitors. Similarly, the monomer may be extracted with a solvent in which the polymer is insoluble, such as methyl or ethyl alcohol. Additionally, the polymer and monomer may be separated by dissolving the product in a solvent for both monomer and polymer and adding a nonsolvent to precipitate the fusible polymer.

The selection of a solvent in which to conduct polymerization or a nonsolvent with which to precipitate polymer is dependent upon the nature of the material undergoing polymerization. With such materials as diethylene glycol diallyl dicarbonate and similar glycol esters of the unsaturated alcohol acid esters of polybasic acids, benzene, acetone, chloroform, xylene, toluene, dioxane, and carbon tetrachloride are suitable solvents. While water and alcohols such as methyl, ethyl, propyl, alcohol or glycol or paraffin hydrocarbons are suitable nonsolvents.

The fusible polymers so produced have many characteristics which are similar to those of usual thermoplastic polymers. They are generally soluble in such organic solvents as acetone, dioxane, benzene, toluene, chloroform, ethyl cellosolve acetate, triacetin, phenyl cellosolve, etc., and soften or flow upon heating under atmospheric pressure. They are precipitated from solutions by use of nonsolvents as white amorphous powder or as plastic semi-liquid resins.

The time required for polymerization to the fusible state is dependent upon the nature of the material, the catalyst concentration and the temperature of polymerization. In the case of the carbonate esters, such as diethylene glycol diallyl dicarbonate, polymerization in solution for a period of 17 hours is found to be satisfactory when the temperature is 60° C. This period must be materially shortened with rising temperatures and at 100° C. it is found that the fusible polymer must be recovered within a few minutes after the polymerization reaction is initiated. Similar variations of time of polymerization in accordance with the temperature is found necessary in treating other polymerizable materials. In any case, however, the polymer is preferably recovered by interrupting polymerization as the monomer undergoing treatment grows viscous since after solidification thereof the polymer may be found to be substantially insoluble.

In accordance with our invention, we have found that upon subjection of these polymers to heating at temperatures somewhat above the softening point thereof, for a sufficient period of time, they are converted into infusible, insoluble, transparent, hard and wear-resistant products. This conversion may be assisted by the incorporation of usual polymerization catalysts, such as oxygen, ozone, air, peroxides, such as hydrogen peroxide or benzoyl peroxide, basic or acidic catalysts, light, etc. By use of catalysts, it is found that the conversion of these products to the infusible state may be secured at lower temperatures. In order to secure transparent uniform products, the polymerization should be controlled to permit the polymer to flow together, or if desired, to become completely molten prior to converting the polymer to its infusible state. The application of superatmospheric pressure assists the production of satisfactory products.

By operating in accordance with the present invention, it is thus possible to form a molded article from the fusible polymer such as the fusible polymeric diethylene glycol diallyl dicarbonate, diethylene glycol dimethallyl dicarbonate, or other products previously referred to, and thereafter, to render the molded products insoluble and infusible by heat. In this manner, we are able to prepare transparent, hard, infusible molded products which have many of the desirable properties of the conventionally known thermoplastic resins as well. By proper regulation of the pressure and temperature, the fusible polymer may be extruded under such conditions that it becomes infusible as it leaves the extrusion die.

Since the fusible polymer is a true thermoplastic, it often may be kept in the molten state for an indefinite period, particularly by incorporating an inhibitor such as hydroquinone, whereby conversion to the infusible state may be prevented. Likewise, polymerization may be delayed to such an extent that molten products may be obtained prior to polymerization by utilizing mixtures of catalysts and inhibitors. It is thus possible to form cast or molded products by melting a quantity of the fusible polymer with a quantity of polymerization inhibitor in a suitable mold. These products may then be converted to the infusible state by introduction of catalysts or by catalysts previously introduced. In some cases, polymerization of such products may be assisted by heating the molded or cast material in a molten or solid state in the presence of air, peroxides, etc. In accordance with a further modification, the cast or molded thermoplastic polymer may be coated with a solution of catalyst or a film of monomer or a solution of fusible polymer which contains high catalyst concentration may be applied to the surface of the molded product. Heat, pressure, and/or ultra-violet light may be utilized to convert the polymer to the infusible state.

In addition, it is possible to effect a conversion of the exterior of the plastic without completely converting the interior thereof to the infusible, insoluble state. Thus, cast or molded products, made from the fusible polymers herein described may be subjected to local surface heating whereby the surface is converted without complete conversion of the interior. In this manner, it is possible to secure integral products possessing a great flexibility and resiliency, the surfaces of which are extremely hard and insoluble. Similar products may be secured by increasing the catalyst concentration of the fusible polymer adjacent the surface thereof by suitable methods, for example, by application of a coating containing catalysts as described above. Similar products may be secured by incorporation of an inhibitor in the interior of the product or by varying the amount of plasticizer in the interior and exterior portions of the sheet, whereby the interior converts to a flexible gel due to the presence of added plasticizer.

A large number of inert substances may be incorporated with the fusible polymer before subjecting the molding condition. Suitable for such purposes are: plasticizers, softening agents or fillers, such as dibutyl phthalate, dicyclohexyl phthalate, triacetin, tricresyl phosphate, natural or synthetic resins, pigments, including titanium dioxide, carbon black, chromic oxide, lead chromate, etc., and organic dyestuffs, such as methylene blue, methyl orange, etc.

If desired, similar products may be made from suitable copolymers, for example, the diethylene glycol diester of allyl acid carbonate or similar ester may be copolymerized with other compatible polymerizable materials such as acrylates or alpha-substituted acrylates, for example, methyl, allyl, or glycol methacrylate, vinyl acetate, vinyl chloride, styrene, allyl esters such as allyl acetate, maleate, fumarate, phthalate, succinate, oxalate, tartarate, or the corresponding vinyl, crotyl, methallyl, 2-chlorallyl or other unsaturated alcohol esters to form the desirable products in accordance with our invention. Products of widely varying composition containing from 2 to 90 percent of the modifying polymerizable material may be polymerized.

These resins are also suitable for many uses in the field of laminated products. For example, products of great strength, elasticity and adherence may be secured by impregnating fibrous sheets of paper, linen, canvas, etc., with the monomer or polymer herein described, forming a laminated product, and curing the same to an infusible state.

Leather, paper, wood, or other comparatively porous substances may be steeped in a solution of the fusible polymer or a molten body thereof, and one or more layers heated under pressure, generally in the presence of catalyst, to convert the absorbed polymer to the infusible, insoluble form. Greatly improved products, particularly in regard to strength, waterproofing and electrical properties are obtained.

The polymers which we have prepared are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of the esters herein contemplated is deposited upon polymerized methyl methacrylate or similar polymer, and the solvent removed, a coherent surface thereof is formed. Upon heating the coated article to suitable temperatures, this surface may be made transparent, hard and infusible.

Coatings may be applied to metal, glass, wood, synthetic resins, etc. surfaces by extrusion of the heated fusible polymer directly on the suitably-prepared surface. In similar manner, the surface may be heated and the polymer applied in powdered form, whereupon fusion occurs, first to give a smooth homogeneous film which may then be heat-hardened.

The process may also be extended to the production of mixed polymers or copolymers. Thus, the fusible polymer prepared in accordance with our invention may be mixed with other monomers or polymers, such as the monomer or polymer of methyl methacrylate, methyl chloracrylate, vinyl acetate, vinyl chloracetate, vinyl chloride, styrene, etc., and the mixture subjected to conditions of polymerization.

The following examples are illustrative:

*Example I*

Phosgene was bubbled into a flask containing allyl alcohol at a rate of 20 millimoles per minute while agitating the mixture and cooling to a temperature below about 15 to 20° C. After phosgene in the proportion of about 0.9 mole of phosgene per mole of allyl alcohol had been introduced the mixture was allowed to stand for one hour. Thereafter, the reaction mixture was washed with water to remove unreacted allyl alcohol and dried over calcium chloride.

7.3 moles of allyl chloroformate was added dropwise to a solution of 3.3 moles of triethylene glycol in 8 moles of pyridine while cooling the reaction mixture to a temperature of 10 to 15° C. After the chloroformate had been added, the mixture was allowed to stand at room temperature for about an hour. The product was diluted with water, washed with dilute HCl solution and then with sodium chloride solution until the product was neutral. Thereafter the ester was washed with water and dried over calcium chloride. The triethylene glycol bis (allyl carbonate) obtained was a colorless liquid which has an index of refraction $$(N_D^{20})$$

of about 1.4510–1.4520, a density of $$(D_4^{20})$$

about 1.131–1.140, and the probable formula of this compound was as follows:

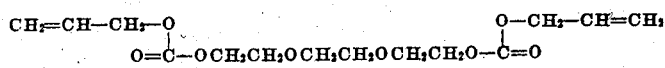

Example II

The process described in Example I was repeated using an equivalent amount of diethylene glycol in lieu of triethylene glycol. The ester thus obtained was a colorless liquid which had an index of refraction of about 1.449 at 20° C., a density of about 1.133 at 20° C./4° C. and a boiling point of about 156° C. at a pressure of 2 mm.

Example III

The process described in Example I was repeated using an equivalent amount of tetraethylene glycol in lieu of triethylene glycol. The ester thus secured was a colorless liquid which had an index of refraction $$(N_D^{20})$$

of about 1.454 at 20° C. and a density of 1.133 at 25° C. Polymerization of this material occurred when distillation was attempted at 2 mm. pressure.

Example IV

The process of Example I was repeated using an equivalent amount of methallyl alcohol in lieu of allyl alcohol. The triethylene glycol bis(methally carbonate) obtained was a colorless liquid which polymerized when distillation at a pressure of 2 mm. was attempted.

Example V 25 moles of phosgene was passed into 10 moles of diethylene glycol at a rate of 100 millimoles per minute and at a temperature below about 20° C. The reaction mixture was warmed to 35° C. and evacuated for several minutes by means of a vacuum pump to remove excess phosgene. The reaction mixture was washed four times with water and dried over calcium chloride, whereby the dichloroformate of diethylene glycol was obtained. This compound was a colorless liquid.

2.79 moles of diethylene glycol bis(dichloroformate) was added slowly to 6.14 moles of 2-chlorallyl alcohol dissolved in 6.7 moles of pyridine. The reaction mixture was washed and purified as in Example I. The product obtained, diethylene glycol di(2-chlorallyl carbonate) was a colorless liquid which had an index of refraction $$(N_D^{20})$$

of about 1.472 and a density $$(d_4^{20})$$

of about 1.3.

Example VI

This example was the process of Example II repeated, using an equivalent amount of methallyl alcohol in lieu of allyl alcohol. The diethylene glycol bis(methallyl carbonate) obtained was a colorless liquid having a refractive index at 20° C. of about 1.453, a density $$(d_4^{20})$$

of about 1.114.

Example VII

The process of Example III was repeated using an equivalent amount of methallyl alcohol in lieu of allyl alcohol. The methallyl ester thus produced was a colorless light boiling liquid which polymerized when distillation was attempted at 2 mm. pressure.

Example VIII

Diethylene glycol dihydrogen maleate was prepared by heating one mole (62 g.) of diethylene glycol with 2 moles (196 g.) of maleic anhydride at 150–160° C. for 2 hours. Four moles (232 g.) of allyl alcohol, 5 g. of p-toluenesulfonic acid, and 500 g. of carbon tetrachloride were then added and the resulting mixture was heated in an apparatus designed for continuous distillation, with separation of the nonaqueous layer of the distillate and continuous return of this layer to the reaction mixture. The esterification was continued until no further aqueous layer collected in the distillate. Carbon tetrachloride and allyl alcohol were then recovered by distillation under partial vacuum. The oily product was washed with dilute alkali and water, dried over anhydrous calcium sulfate, and decolorized by heating with activated carbon. The resulting product was a nearly colorless oil, believed to be diethylene glycol diallyl dimaleate.

Example IX 3 moles of allyl alcohol was heated with one mole of diethylene glycol dihydrogen diphthalate in the presence of benezene and small quantities of hydroquinone and benzene sulfonic acid. The water formed during the reaction was distilled off with benzene as formed and the benzene returned to the system. Heating was continued until evolution of water ceased and after washing and drying, a colorless, viscous, oil liquid was obtained. This liquid polymerized readily upon heating at 100° C. in the presence of 2 percent by weight of benzoyl peroxide.

Example X

A quantity of diethylene glycol bis (allyl carbonate) prepared as in Example II, was dissolved in an equal weight of dioxane and 4 percent benzoyl peroxide on the basis of the weight of the polymer was introduced. The solution was heated, with stirring, at 80 to 85° C. until the viscosity doubled. Thereafter, the mixture was cooled and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white fusible polymer was obtained. A quantity of this polymer was mixed with 5 percent benzoyl peroxide, placed in a mold and heated to 150° C. under a pressure of 2000 lbs. per sq. in. for 20 minutes. A transparent sheet of infusible, insoluble polymer was obtained.

*Example XI*

A quantity of diethylene glycol bis(methallyl carbonate) prepared as in Example VIII, was dissolved in an equal weight of dioxane and 4 percent benzoyl peroxide on the basis of the weight of the polymer was introduced. The solution was heated, with stirring, at 80 to 85° C. until the viscosity doubled. Thereafter, the mixture was cooled, and methanol was added to the point of turbidity. It was then added to 5 volumes of methanol with vigorous stirring. The polymer was separated by decantation, dissolved in acetone, reprecipitated with methanol and again recovered. The polymer was then dried under subatmospheric pressure to constant weight. A white gummy mass was obtained. A quantity of this polymer was mixed with one percent benzoyl peroxide, placed in a mold and heated to 150° C. under a pressure of 2000 lbs. per sq. in. for 20 minutes. A colorless sheet of infusible, insoluble polymer was obtained.

Although the present invention has been described with reference to the specific details of certain embodiments thereof, it is not intended that such details shall be regarded as limitations upon the scope of the invention, except insofar as included in the accompanying claims. The term "polyester" in the claims is intended to refer to the degree of esterification of the alcohol and is not intended to refer to polymerization.

We claim:

1. A polyester of (a) a polyglycol and (b) an acid ester of an unsaturated alcohol and carbonic acid in which both hydroxy groups of the polyglycol are esterified with the acid ester.

2. A polyester of (a) a polyethylene glycol and (b) an acid ester of an unsaturated alcohol and carbonic acid in which both hydroxy groups of the polyglycol are esterified with the acid ester.

3. A polyester of (a) a diethylene glycol and (b) an acid ester of an unsaturated alcohol and carbonic acid in which both hydroxy groups of the polyglycol are esterified with the acid ester.

4. Diethylene glycol di(allyl carbonate).

5. Diethylene glycol di(methallyl carbonate).

6. A polymerized ester of (a) a polyglycol and (b) an acid ester of an unsaturated alcohol and carbonic acid in which both hydroxy groups of the polyglycol are esterified with the acid ester.

7. A polymerized polyester of (a) a polyethylene glycol and (b) an acid ester of an unsaturated alcohol and carbonic acid in which both hydroxy groups of the polyglycol are esterified with the acid ester.

8. A polymerized polyester of (a) diethylene glycol and (b) an acid ester of an unsaturated alcohol and carbonic acid in which both hydroxy groups of the polyglycol are esterified with the acid ester.

9. Polymerized diethylene glycol di(allyl carbonate).

10. Polymerized diethylene glycol di(methallyl carbonate).

11. A method of preparing a substantially infusible, insoluble polymer which comprises polymerizing a polyester of (a) a polyglycol and (b) an acid ester of an unsaturated alcohol and carbonic acid in which both hydroxy groups of the polyglycol are esterified with the acid ester, interrupting polymerization after substantial polymerization has occurred, but before the polymer is converted to an infusible gel, separating a substantial portion of residual monomer from the resulting fusible polymer before the polymer is polymerized to an infusible state and continuing polymerization of the said polymer for a time sufficient to convert the said polymer into a substantially insoluble and infusible state.

12. The process of claim 11 wherein the unsaturated alcohol is allyl alcohol.

13. The process of claim 11 wherein the unsaturated alcohol is methallyl alcohol.

14. The product of claim 1 in which the alcohol has up to ten carbon atoms and an unsaturated linkage in an aliphatic chain.

15. The product of claim 1 in which the alcohol is methallyl alcohol.

16. The product of claim 1 in which the alcohol is allyl alcohol.

17. The product of claim 6 in which the alcohol has up to ten carbon atoms and an unsaturated linkage in an aliphatic chain.

18. The product of claim 7 in which the alcohol has up to ten carbon atoms and an unsaturated linkage in an aliphatic chain.

19. A polyester of (a) tetraethylene glycol and (b) an acid ester of an unsaturated alcohol and carbonic acid in which both hydroxy groups of the polyglycol are esterified with the acid ester.

IRVING E. MUSKAT.
FRANKLIN STRAIN.